United States Patent

[11] 3,563,600

[72] Inventor Maurice Converse
 1311 Briarhill Drive, Akron, Ohio 44313
[21] Appl. No. 814,225
[22] Filed Mar. 11, 1969
[45] Patented Feb. 16, 1971
 Continuation-in-part of application Ser. No. 657,992, Aug. 2, 1967, now abandoned.

[54] INFANT SAFETY CAR SEAT
 14 Claims, 18 Drawing Figs.
[52] U.S. Cl. .................................................. 297/254, 297/390
[51] Int. Cl. .................................................. A47d 1/10
[50] Field of Search .......................................... 297/250, 254, 253, 390, 230, 255, 256

[56] References Cited
 UNITED STATES PATENTS

| | | | |
|---|---|---|---|
| 1,486,813 | 3/1924 | Tallman | 297/390X |
| 2,541,501 | 2/1951 | Criner | 297/256X |
| 2,664,150 | 12/1953 | Byrne | 297/390 |
| 2,777,502 | 1/1957 | Travis | 297/250 |
| 3,014,761 | 12/1961 | Otto | 297/254X |
| 3,065,028 | 11/1962 | Irion | 297/390 |
| 3,103,385 | 9/1963 | Grieco | 297/390X |
| 3,206,247 | 9/1965 | Johnson | 297/254 |
| 3,232,665 | 2/1966 | Von Wimmersperg | 297/390X |
| 3,325,213 | 6/1967 | Levy | 297/250X |
| 3,424,497 | 1/1969 | Brilmyer | 297/390 |

*Primary Examiner*—Francis K. Zugel
*Attorney*—Sughrue, Rothwell, Mion, Zinn and MacPeak ABSTRACT: An infant seat of the type adapted to be releasably secured to an automobile seat by means of the standard automobile seat belt extending about the base thereof and an additional connecting device securing the top portion of the infant seat to the back of the automobile seat is constructed from a molded plastic shell-like member having a removable front portion which substantially encapsulates the child. The detachable front portion may be slidably or pivotally arranged with respect to the main seat portion and secured in place by means of a suitable quick release latch device. Additional child-restraining belt devices may be provided within the infant seat.

PATENTED FEB 16 1971
3,563,600
SHEET 1 OF 5
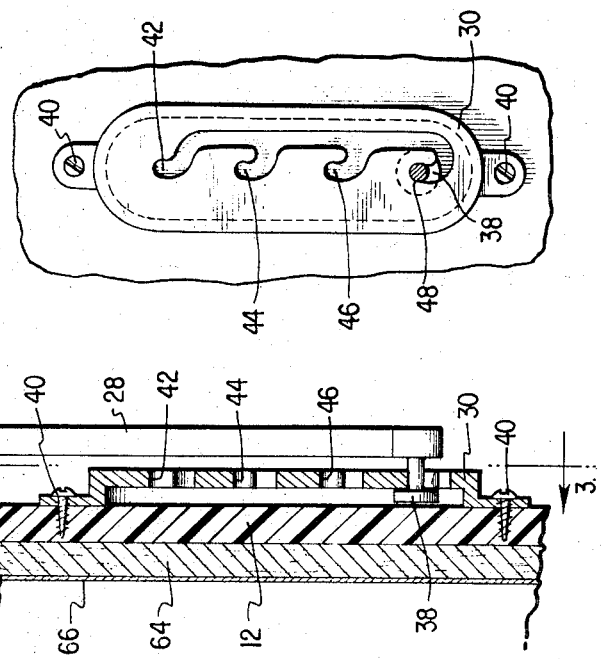
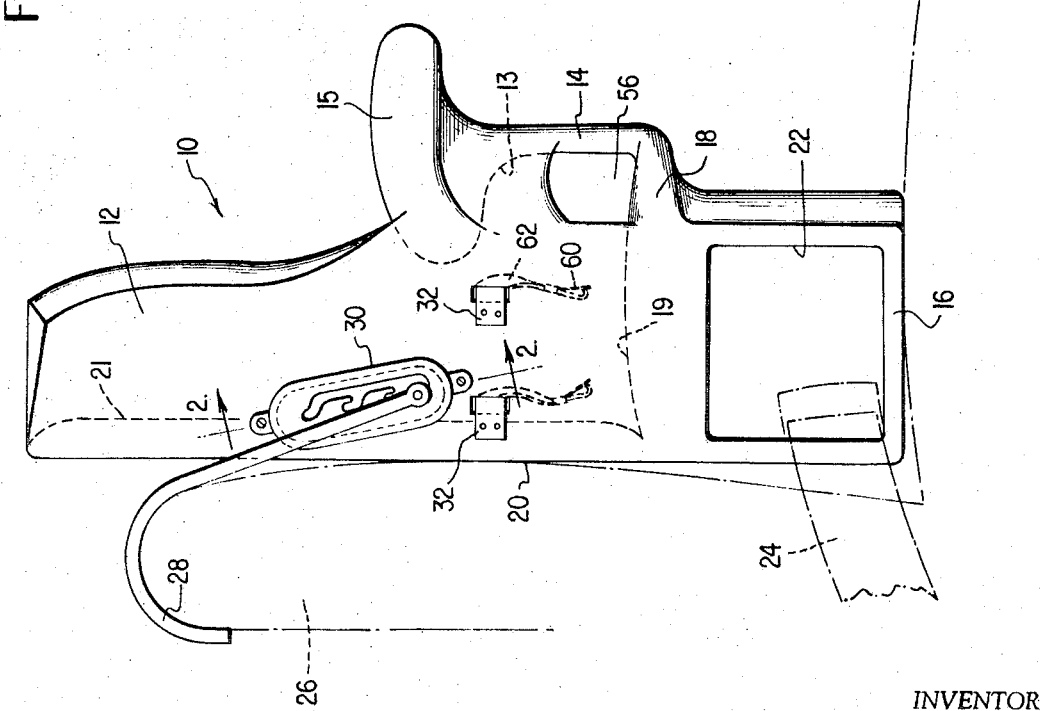
INVENTOR
MAURICE CONVERSE
BY
Sughrue, Rothwell, Mion, Zinn & Macpeak
ATTORNEYS

INVENTOR
MAURICE CONVERSE

PATENTED FEB 16 1971

INVENTOR
MAURICE CONVERSE

BY
Sughrue, Rothwell, Mion, Zinn & Macpeak
ATTORNEYS.

INVENTOR
MAURICE CONVERSE

BY Sughrue, Rothwell, Mion, Zinn & Macpeak
ATTORNEYS

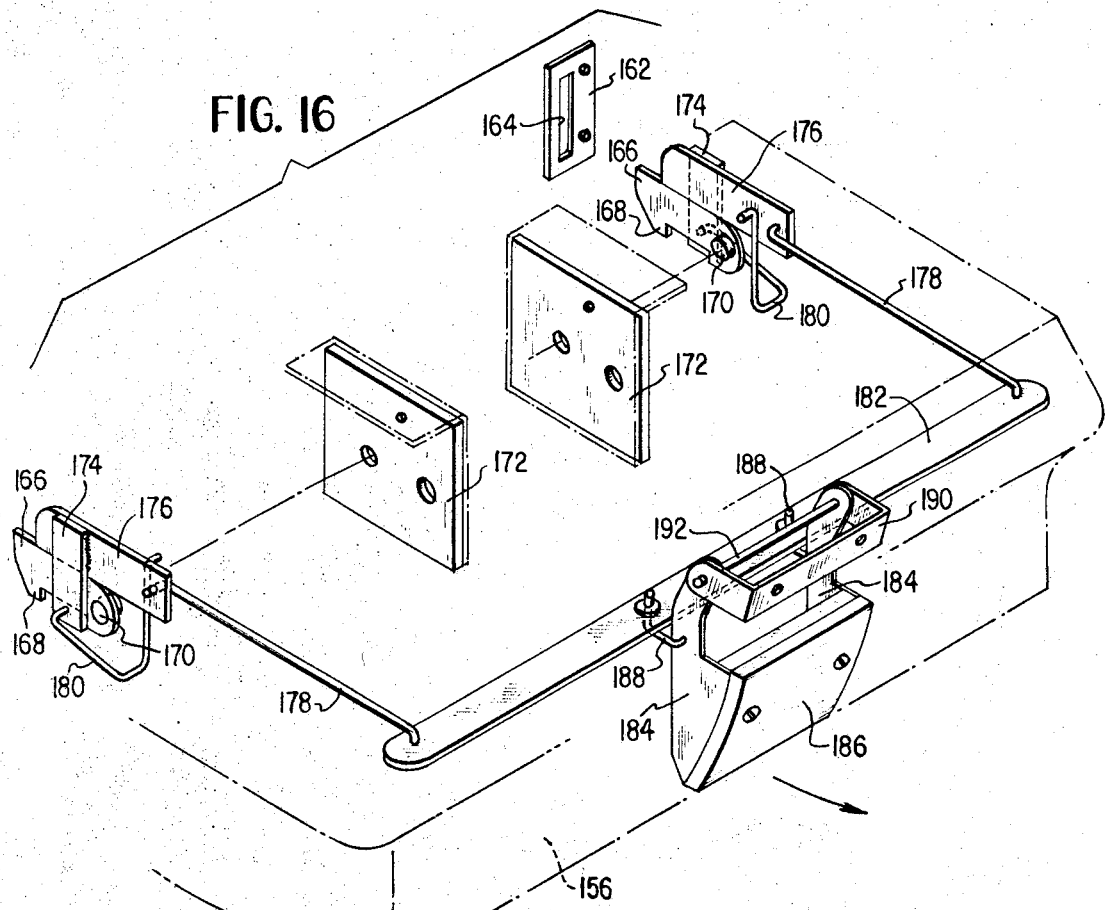
FIG. 16
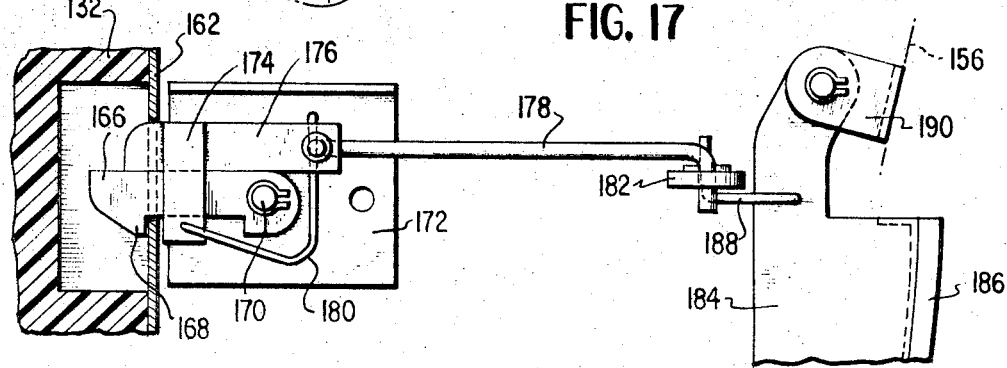
FIG. 17
FIG. 18
INVENTOR
MAURICE CONVERSE
BY Sughrue, Rothwell, Mion, Zinn & Macpeak
ATTORNEYS.

INFANT SAFETY CAR SEAT

CROSS-REFERENCE TO RELATED APPLICATIONS

This application is a continuation-in-part application of application Ser. No. 657,992, filed Aug. 2, 1967 now abandoned.

BACKGROUND OF THE INVENTION

1. Field of the Invention

This invention relates generally to chairs and seats of the safety padded type used for holding infants while riding in an automobile. The invention further relates to an infant seat construction which may be positively, but releasably, anchored to the automobile seat by use of the conventional automobile safety seat belts.

2. Description of the Prior Art

It has been proposed in the prior art to utilize a self-contained infant safety seat in conjunction with the conventional automobile seat for holding infants while traveling in an automobile. Such prior art devices usually encompass merely a general chair or seat-type contour which is secured to the automobile seat by rigid hooks which fit over the back of the vehicle seat. It has also been proposed to utilize the automobile safety seat belt to secure the base of an infant-type safety seat and to use a harness in conjunction with the infant seat to restrain the infant. However, such devices generally do not provide a means for positively securing the infant seat to the automobile seat since the automobile safety belt is usually just secured around the base of the seat, thus allowing the seat to slip through the belt in the event of an automobile turnover. Further, the prior art devices, while incorporating a harness in conjunction with the seat, do not allow limited free movement of the infant since the harness of prior art devices is of the type which is adapted to restrain the infant from movement within the seat. A child will not tolerate tight restraints. Shoulder straps are difficult and cumbersome to put in place. Furthermore, crossed shoulder straps can cause a severe neck injury if the vehicle is struck from the side because of the neck hitting the relatively rigid edge of the strap. On the other hand, if the straps are too loose they will fall off or permit the child to fall through the opening between the two straps. In order to use straps of this nature the child must be old enough to sit up and such an arrangement is, therefore, no good for small infants.

The present invention overcomes the disadvantages of the prior art by providing a seat in which an infant is placed which allows limited free movement of the infant, while at the same time, positively securing the infant to the seat. The infant seat is provided with a means for positively securing the seat to the automobile seat by utilizing both the standard automobile safety belt to secure the bottom of the infant seat and a hook means to secure the top of the infant seat to the back of the automobile seat. The present invention further provides straps in conjunction with the infant seat which are adapted to engage some form of harness worn by the infant to thus allow the infant to move freely within the seat, but limiting such movement to the confines of the seat interior. The present invention further provides a padded dash in the area of the chest of the infant to restrain the infant's body in the event of a sudden deceleration of the automobile in which the seat is secured. With the construction of the present invention, a harness vest is worn by the infant to prevent the infant from slipping out of the seat, while allowing a full range of movement within the seat area. According to the construction of the "harness vest" of the present invention the vest portion actually encloses the harness which is secured to the inside of the vest. The purpose of the vest is that it keeps the harness in a constant position enabling quick, easy and accurate positioning of the harness of the child via the vest. The seat portions surrounding the infant provide the necessary padded support not only in the back but also on the sides and in the front as well to provide complete impact protection for the infant without unduly restraining the infant's free motion.

SUMMARY OF THE INVENTION

The safety car seat of the present invention is used for infants or small children and is of the type adapted to rest on a conventional automobile seat. The seat construction comprises an upwardly extending vertical back portion, a horizontal bottom portion, two forwardly extending vertical side portions, a seat portion and a front portion. The back portion extends above the head of the infant or child placed in the seat and provides back support to prevent injuries, such as whiplash, resulting from rear end collisions. The side portions are outwardly flared with respect to an infant user so as to provide complete side support, while at the same time, not presenting a sharp corner on which the infant's head may impact. The flared side portions also act to funnel the child's head back to the head rest upon sudden forward acceleration of the vehicle. The side portions may be provided with an aperture below the seat area which is adapted to receive the conventional automobile safety belt to positively secure the base of the infant seat to the automobile seat or the conventional automobile safety belt may be extended around the lower part of the front portion in a suitable recess formed therein. The upper portion of the infant seat may be secured to the back of the automobile seat by means of hook members adjustably mounted on the side portions or an adjustable hook detachably secured to the automobile seat may cooperate with a suitable edge portion of the infant seat adjacent the top thereof. The front portion of the infant seat is provided with apertures for receiving the legs of an infant therethrough and the upper portion of the front portion is constructed as a broad flat surface disposed an an angle relative to the vertical back portion so as to provide a padded dash to prevent injuries in the event of a forward collision. The infant safety car seat of the present invention may further be provided with straps adapted to cooperate with a harness worn by the infant to prevent the infant from climbing or being thrown out of the seat, while at the same time, allowing limited free movement of the infant within the seat area.

Other features of the invention will be pointed out in the following detailed description and claims and illustrated in the accompanying drawings, which disclose, by way of example, the principles of the invention and the best mode which has been contemplated of applying those principles.

BRIEF DESCRIPTION OF THE DRAWINGS

FIG. 1 illustrates the side view of the present infant safety car seat and the manner in which it is secured to the automobile car seat;

FIG. 2 illustrates a section taken along lines 2—2 of FIG. 1 showing a cross section of the adjustable bracket and hook securing device employed on the sides of the seat of the present invention;

FIG. 3 illustrates a front sectional view taken along the lines 3—3 of FIG. 2 of the bracket for the adjustable hook securing device of FIG. 1;

FIG. 4 illustrates a sample vest to be worn by the infant when using the seat of the present invention;

FIG. 16 is a perspective exploded view of the latch mechanism with the seat portion partially shown in phantom lines;

FIG. 17 is a side elevational view, partly in section, showing the details of the latch device in the latched condition, and FIG. 18 is a view similar to FIG. 17 showing the latch in the unlatched condition.

DETAILED DESCRIPTION OF THE INVENTION

Figure 5:
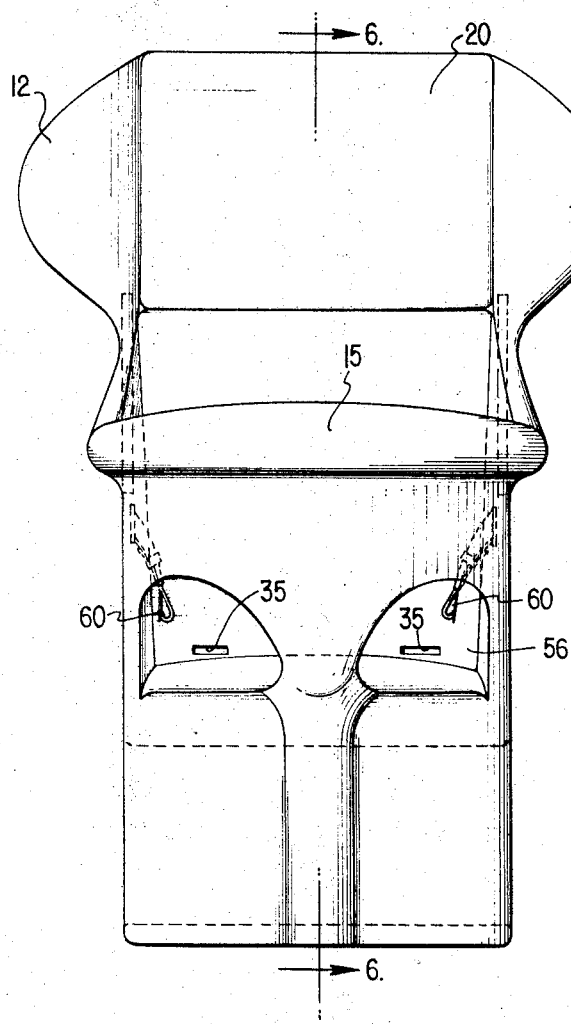
FIG. 5 illustrates a front view of the infant seat illustrated in FIG. 1.

Referring specifically to FIGS. 1 and 5, the infant safety seat, generally designated at 10, comprises a horizontal base member 16 to which is attached an upwardly extending vertical back portion 20 and two side portions 12. The back portion 20 and the two side portions 12 extend vertically above the head of an infant seated therein and provide, respectively, back support and side support for the infant. This is especially important since most deaths from accidents with respect to children seated in a child's car seat are due to head and neck injuries. The side portions 12 are outwardly flared with respect to the infant user so as to present no sharp corners, such as at the front edge of the side portions 12 on which the infant could strike his head. The flare of the side portions 12 is a gradual outward curve and readily provides side head support for the infant user such that the infant may readily rest his head on the side portions 12, while sleeping. The flared side portions also act to funnel the child's head back to the head rest upon sudden forward acceleration of the vehicle. A horizontal seat portion 18 positioned above the bottom portion 16 is rigidly secured to the back portion 20 and sides 12 and extends forwardly parallel to the bottom portion 16. A vertical front portion 14 extends upwardly from the bottom portion 16 and is rigidly secured thereto and to the forwardly extending side portions 12. The front portion 14 terminates above the seat portion 18 in a flared dash 15 in the area of the infant's chest. In automobile accidents a large number of chest injuries are received by children in child's car seats due to impact on the rigid transverse bar across the front of such seats. The flared dash 15 is padded and provided with a large, smooth impact area tending to dissipate and distribute the impact force in a safe manner. The dash 15 is also wide enough so that the child may use it as a head rest for sleeping.

Figure 6:
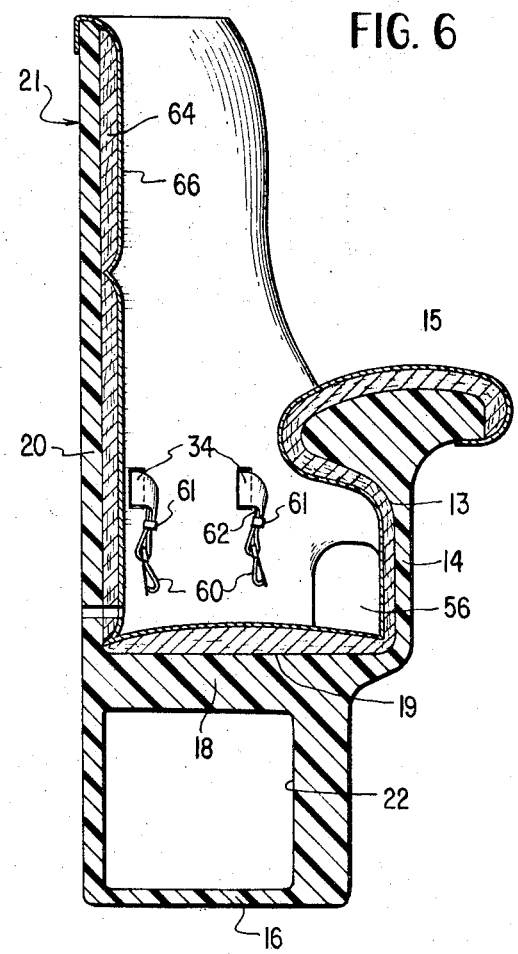
FIG. 6 illustrates a cross section along the lines 6—6 of FIG. 5 showing a cross section of the seat construction of the present invention.

As illustrated in the phantom lines of FIG. 1 and the cross-sectional view of FIG. 6, the inside contour of the seat 10 is that of a generally vertical back 21, generally horizontal seat 19 and a vertical front portion 13 which curves inwardly toward the infant and gradually flares outwardly to form the dash 15.

Apertures 56 are provided through the front portion 14 and are adapted to receive the legs of the infant therethrough. The infant, when positioned in the seat, is provided with back support by the back portion 20, side support by the side portions 12, and front support by the dash 15 and the chest piece beneath the dash.

Apertures 22 located above the bottom portion 16 and below the seat portion 18 are adapted to receive the conventional automobile safety belt 24 to positively secure the infant seat onto the horizontal portion of the automobile seat 26. In the event of a vehicle overturn, the infant safety seat 10 cannot slip from the restraint of the automobile seat belt 24 since the bottom portion 16 is rigidly secured to the back, side and front portions of the seat below the aperture 22.

The side portions 12 are further provided with brackets 30 which receive adjustable hook securing means 28 for securing the upper portions of the infant seat 10 to the vertical back portion of the automobile seat 26. As illustrated in FIGS. 2 and 3, the bracket 30 is secured to the infant safety seat 10 by screws or rivets 40 which extend into the side portions 12. The bracket 30 is provided with four adjustment positions 42, 44, 46 and 48. The seat securing hook 28 is provided at its base with a pin 36 having an enlarged head 38 which is adapted to be received within one of the four adjustment positions illustrated in FIG. 3.

Figure 11:
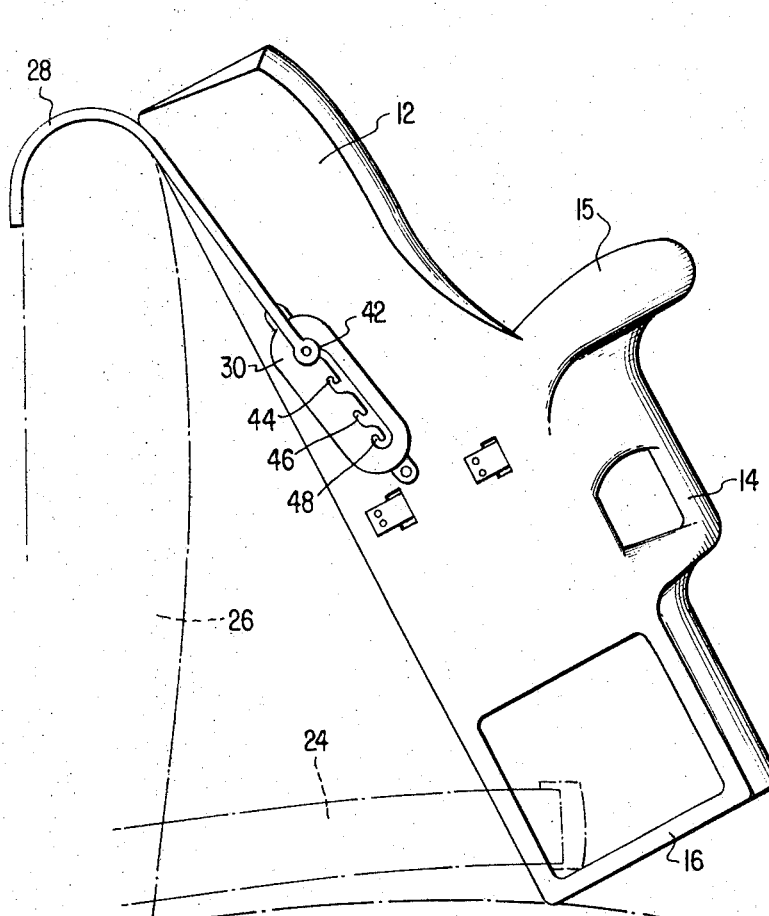
FIG. 11 is a view similar to FIG. 1 showing the seat in the reclining position.

As illustrated in FIG. 1, when the pin 36 of securing hook 28 is in the lowermost adjustment position 48, the infant seat 10 is positioned with its back portion 20 parallel to the back portion of the automobile seat 26 and, consequently, the seat portion 18 is parallel to the horizontal portion of the automobile seat 26. However, if it is desirable to incline the infant seat 10 (see FIG. 11) with respect to the automobile seat 26, pin 36 of the securing hook 28 could be moved to one of the upper adjustment positions 42, 44 or 46 and the automobile safety belt 24 could be loosened to allow the bottom portion 16 to be moved outwardly from the back of the automobile seat 26 to incline the back portion 20 of the infant seat 10 with respect to the back portion of the automobile seat 26. In this position, an infant would be placed in a more desirable sleeping position, while at the same time, being fully confined within the safety seat 10.

As illustrated in FIGS. 1, 5 and 6, the side portions 12 are further provided with apertures 34 therethrough, through which extend belts 62 which are secured by harness brackets 32 to the side portions 12. These belts 62 may be adjustable in length by means of a sliding buckle 61 and may have some form of clip means 60, such as snap hooks or other quick release clip means, which are adapted to be secured to a vest or similar body restraining harness such as that illustrated in FIG. 4. The harness vest 50, as illustrated in FIG. 4, may be provided with a closure fastener 52 along the center and one or more straps 56 extending from each side. The straps 56 may be provided with rings 54 or other suitable securing devices adapted to cooperate with the securing device 60 of straps 62 secured to the infant seat 10. Secured within the harness vest are a pair of shoulder straps 51 and a waist belt 53. The straps 51 and belt 53 may be secured to the vest 50 and each other by means of sewing on other suitable means. The ends of the belt 53 may be releasably latched together by a buckle 55 or other suitable means. The harness vest 50 could then be placed on the infant and the infant then positioned in the seat 10 and clips 60 of straps 62 could then be secured to rings 54 of straps 56 to positively hold the infant within the safety seat 10, while at the same time, allowing limited free movement of the infant within the seat area. The belts 62 could also be joined together at their free ends and be provided with a single clip 60.

Apertures 35 through the back portion 20 are provided for securing the infant user in the seat when it is not desirable to use a harness such as illustrated in FIG. 4. A belt of any desirable type could be inserted through the apertures 35 and secured across the infant's waist. This would firmly secure the infant within the seat 10 and still maintain complete impact protection due to the padded back 20, sides 12 and front dash 15, while allowing the infant free movement from the hips up.

As illustrated in FIG. 6, the bottom portion 16, back portion 20, side portions 12, seat portion 18 and the front portion 14 and dash 15 may be constructed as a single molded unit from a moldable material, such as plastic or other lightweight, rigid substance. Of course, other materials, such as wood, could be utilized to form each or one or more of the portions which would subsequently be joined to form the completed safety seat construction 10. Padding material 64, such as foam rubber, expanded plastic and the like, could be used to cover the interior surfaces which are likely to come in contact with the infant's body when in use to provide a soft safety covering for the rigid seat construction. In addition, some form of washable covering 66, such as vinyl and the like, could be utilized over the padding 64.

Figure 7:
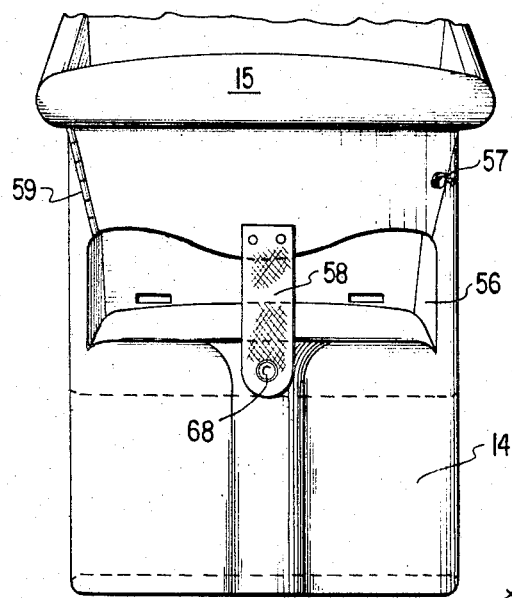
FIG. 7 illustrates one alternative embodiment of the present invention employing a hinged front portion to enable the infant to be placed in the seat from the front.
Figure 8:
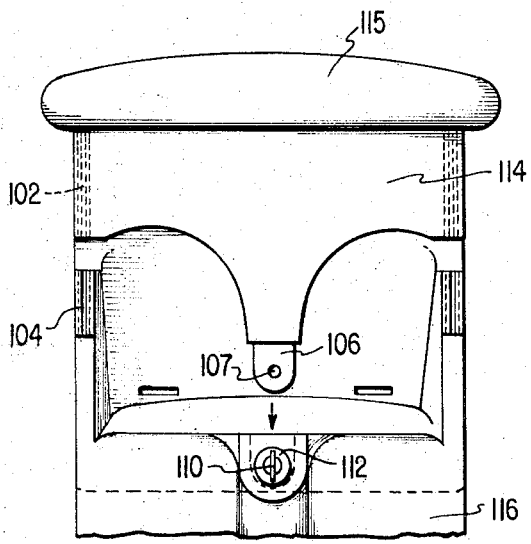
FIG. 8 is a front elevational view of modified seat having removable front portion.
Figure 9:
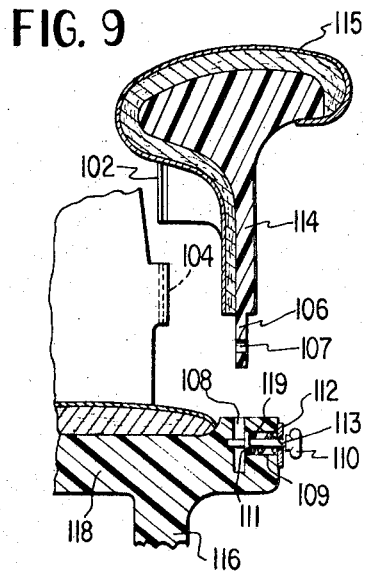
FIG. 9 is a sectional view taken along the lines 9—9 of FIG. 8.
Figure 10:
FIG. 10 is a partial top plan view of FIG. 8.

In the alternative embodiment illustrated in FIG. 7, the front portion 14 is provided with an upper portion 14' which is secured to one side portion 12 by a hinge 59 and to the other side portion by a releasable securing device 57. A strap 58 is secured to the upper front portion 14' and extends across the center of aperture 56' and is releasably secured to the lower front portion 14 at 68 by a snap or the like. In this embodiment, the dash 15 and upper front portion 14' may be swung outwardly to allow the infant to be placed in the safety seat from the front. When the infant has been placed in the seat and secured thereto, the upper front portion could be returned to the position illustrated in FIG. 7 and the releasable securing means 57 and 68 would be secured to provide full front support.

Another embodiment having a removable front portion is shown in FIGS. 8 through 11, inclusive. The dash portion 115 and front portion 114 are removably and slidably secured to the side portions 112 by means of a T-shaped tongue 102 secured to each side of the front portion 114 and inserted into a complementary T-shaped groove 104 formed in each side portion 112.

The lower central portion of the front portion 114 is provided with an integral tongue 106 having a hole 107 therethrough. The forward edge of seat 118 adjacent the base portion 116 is provided with a slot 108 adapted to receive tongue 106. A bore 109 intersects the slot 108 and is provided with a pin 110 slidable therein for cooperation with the hole 107 in tongue 106. The pin 110 is provided with a flange 111 and a cover plate 112 having a hole 113 therethrough is secured over the bore 109. A coil spring 119 is disposed around pin 110 within the bore 109 between the flange 111 and cover plate 112. It is also possible to make the slot 108 a through slot and make the tongue 106 longer with additional holes 107 therethrough. In this manner the overall height of the dash 115 may be adjusted relative to the seat 118 and the pin 110 inserted in locking arrangement with the appropriate hole 107.

Figure 12:
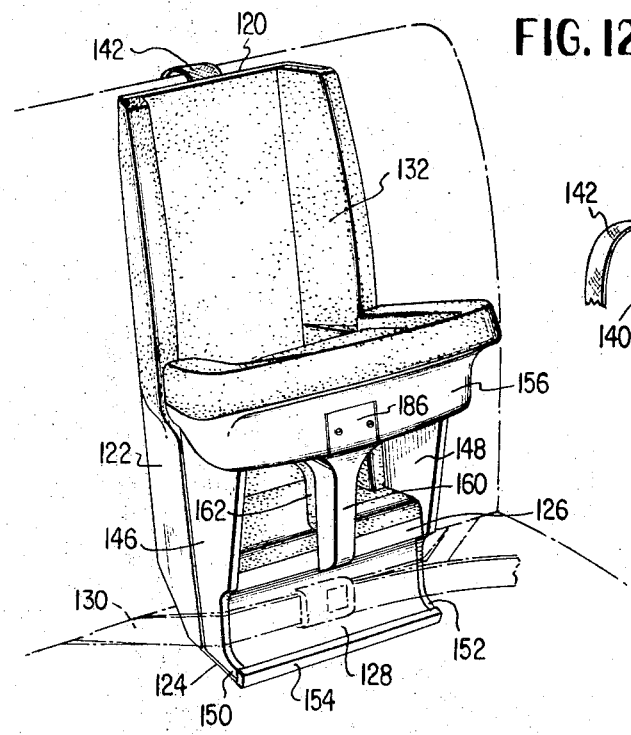
FIG. 12 is a modified form of the infant seat having a quick-release latch allowing the entire front portion to be detached from the rear portion of the seat.

In FIG. 12 a still further embodiment of the infant seat is shown wherein the back portion 120 and the side portions 122 are integrally molded as a single one-piece plastic member. As in the previous embodiments the side portions 122 flare outwardly from the back portion 120 at an angle sufficient to partially encompass the head of the infant in the seat without presenting a forwardly directed edge which might cause injury in the event of an accident.

The base portion 124 and the seat portion 126 may also be integrally molded with the back and side portions or may be molded separately and secured as a unit into the one-piece back and side member. A riser 128 extends between the base portion 124 and the seat portion 126 and is provided with a concave configuration across the entire width thereof for the reception of the seat belt 130 shown in phantom lines in FIG. 12. The seat belt 130 is similar to the standard seat belts required on automobiles by law and does not form a part of the present invention.

The back, side and seat portions are provided with a suitable padding 132 such as foam rubber or the like. The back portion 120 is provided with a cutout 134 which facilitates the entry of a hook member 140 over the edge of the cutout opening 134. The cutout opening is disposed closely adjacent the top of the seat to facilitate the engagement of the hook member 140 with the cutout opening 134. The hook member 140 is slidably adjustable on a strap or belt member 142 which is adapted to be disposed about the back of the automobile seat and secured thereto. Suitable means 144 are provided on the hook member 140 to hold the hook member in the proper adjusted position on the strap 142 and to also secure the hook member to the seat back 120.

The front member is provided with a pair of vertical side members 146 and 148 adapted to rest on the base member 124 which extends forwardly from the rear member 120. The side members are provided with a pair of forwardly extending projections 150 and 152 which are adapted to extend under a reversely-turned lip member 154 which is secured to the forward edge of the bottom member 124. The reversely-turned lip member 154 may be integrally molded with the base member 124 or may be formed as a separate member and subsequently secured to the base member 124.

An upper cross piece 156 extends between the two side members 146 and 148. The cross member 156 is provided with a broad flat upper surface which is slanted upwardly away from the back portion 120. This flat upper surface is covered with suitable padding material 158 similar to the padding material 132 on the back and seat portion. The broad flat upper surface of the cross member 156 provides a large impact area for the child in the event that the child is thrown forwardly as a result of a collision or quick stop. The large surface area enables the force to be distributed evenly with respect to the chest of the child and substantially reduce the risk of chest or rib injuries. A crotch support bar 160 is integrally formed with the cross member 156 and extends downwardly therefrom to divide the opening between the side members 146 and 148 into two separate leg openings. Suitable padding 162 may be provided on the crotch guard 160.

In order to hold the front portion of the infant seat in latched condition with respect to the rear and side portions of the infant seat in order to encapsulate the child within the seat a suitable latching mechanism is provided with the hollow confines of the cross member 156. The latch mechanism is provided with two latches, one at each side of the cross member 156 which cooperates with corresponding latches secured to the side members 122 on the back portion of the infant seat.

FIG. 16 shows the arrangement of the latching mechanism in an exploded view with the front cross member 156 shown only schematically by phantom lines. Since the latch mechanism adjacent each side of the infant seat is identical, only one side of the latching arrangement will be described in detail. A latch plate 162 is secured to each side portion 122 by means of screw fasteners or other suitable means. The latch plate is provided with a slot 164 for the reception of a complementary latch member 166 having a latching shoulder 168 adapted to cooperate with the bottom edge of the slot 164 to hold the front portion of the infant seat in assembled relation to the back portion of the infant seat. The latch member 166 is pivoted at 170 to an assembly plate which may be fastened to the front half of the infant seat by any suitable means. It is possible to mold the assembly plate integrally with the cross member 156. A latch lock member 174 is disposed in sliding engagement with the side of the latch plate 166 and is integrally connected to a rearwardly extending plate 176 to which a pull rod 178 is secured. A spring wire member 180 is secured at one end to the assembly plate 172 and at the other end to the lower extremity of the latch lock plate 174.

The opposite end of the pull rod 178 is secured to one end of a draw bar 182 which extends substantially the entire width of the cross member 156. The draw bar 182 is secured to each arm 184 of an operator plate 186 by means of connecting members 188. The arms 184 are pivoted to a bracket 190 which is secured to the cross member 156 by screws or other suitable means such as being integrally molded with the cross member 156.

The particular latch mechanism described above provides for a quick release of the latch to enable the front portion of the car seat to be removed from the rear portion and allow the child to be removed from the seat. When placing the child in the seat, it is only necessary to hook the projections 150 and 152 on the side members of the front portion of the seat under the lip or flange 154 and pivot the front portion of the seat rearwardly about this point of engagement. The latch members 166 will be automatically aligned with the opening 164 in the latch plate 162 and will be automatically latched therein upon insertion due to the pivoting action of the front portion.

Figure 15:
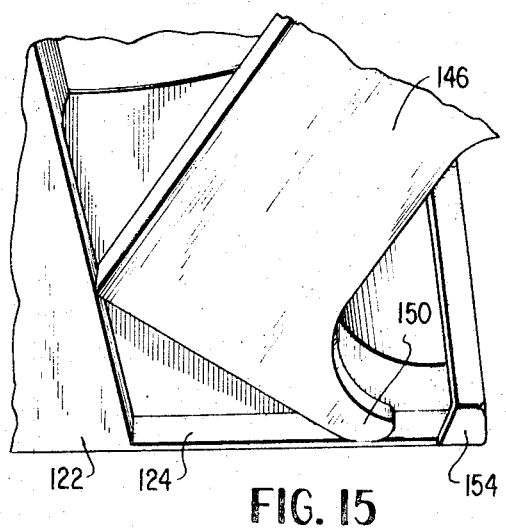
FIG. 15 is a partial side elevational view showing the details of the interfitting connection between the front portion and the rear portion of the seat.

To unlatch the front portion from the rear portion of the seat it is only necessary for a person to grasp the plate 186 and pull it forwardly thereby pivoting the member about the pivot pin 192. The forward pivotal movement of the member 186 will draw the draw bar 182 forwardly and, accordingly, pull the pull rods 178 in a forward direction away from the back portion of the seat. Since pull rods 178 are connected to the extensions 176 of the latch retaining plate 174 and the extension 176 will also move forwardly away from the rear portion of the seat. As viewed in FIGS. 17 and 18 this movement will be to the right and as the member 174 moves to the right the connection thereof with the spring member 180 will cause the latch plate 166 to pivot upwardly about the pivot point 170 as shown in FIG. 18. This pivotal movement will enable the latch shoulder 168 to clear the edge of the opening 164 in the latch plate 162 and the entire front portion of the infant seat will pivot forwardly away from the rear portion of the seat. If it is desired to remove the front portion completely, continued pivotal movement will allow the projections 150 and 152 to be withdrawn from beneath the flange 154 as shown in FIG. 15. Then the entire front portion can be lifted away from the rear portion.

Figure 13:
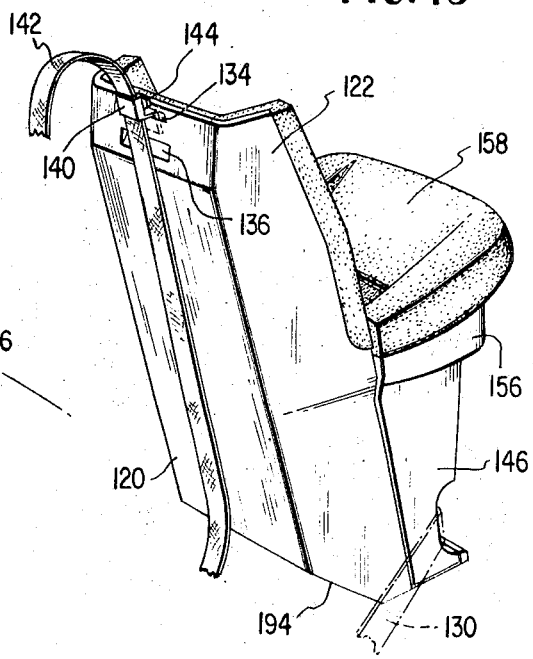
FIG. 13 is a rear perspective view of the seat shown at FIG. 12.
Figure 14:
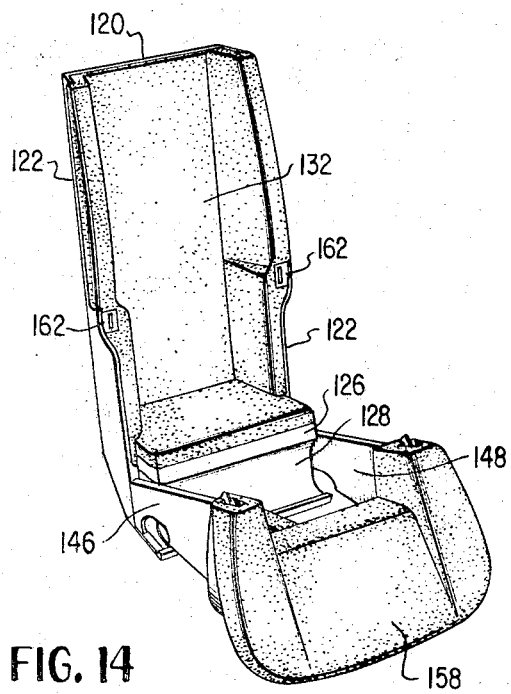
FIG. 14 is a perspective front view of the seat showing the front portion disengaged from the rear portion.

As with the previous embodiment shown in FIGS. 1 through 11, it might be desirable to provide the infant seat shown in FIGS. 12 through 18 with additional safety belt means for restraining the infant within the seat. The additional safety belt means may be identical to those illustrated in the previous embodiment or may be secured externally of the infant car seat to the bottom sloping surface 194 at the bottom of the rear portion 120 (FIG. 13). The two halves of the seat belt would then merely extend around the forward edge of the side members 122 and since the straps would not have considerable thickness they would not interfere with latching the front portion of the seat to the rear portion of the seat. The additional safety belt means could be the ordinary wrap-type belt similar to the standard automobile seat belt 130 shown in FIG. 12 or the straps may have fastening means on the end for cooperation with a vest-type restraining means such as shown in FIG. 4.

I claim:

1. A safety car seat of the type used for infants and adapted to rest on and be releasably secured to a conventional automobile seat comprising: back, front and side portions secured together to form a vertically extending, substantially enclosed boxlike structure, a bottom portion secured to said back portion and extending forwardly for resting on said automobile seat, said back and side portions extending above said front portion, said side portions above said front portion being outwardly flared with respect to the interior of said structure so as to provide side supports for an infant's head, a seat portion spaced from said bottom portion and extending parallel thereto secured to said back and side portions, means intermediate said bottom and seat portions for receiving a conventional automobile safety seat belt whereby said seat may be secured on said automobile seat, said front portion comprising a rigid cross member spaced above said seat portion and extending between and secured to said side portions, said cross member having a broad upper surface slanting upwardly away from said back portion to provide a safety dash, crotch guard means secured to and extending downwardly from said cross member intermediate said side portions to define two leg openings between said crotch guard means and said side portions, and means for detachably securing the upper portion of said infant seat to the back portion of a conventional automobile seat.

2. A safety seat as set forth in claim 1 wherein said portions of said seat adapted to come in contact with the body of an infant are padded.

3. A safety seat as set forth in claim 1 further comprising safety strap means secured to said seat for securing an infant within said seat.

4. A safety car seat as set forth in claim 1 wherein said means for securing the upper portion of said seat to the automobile seat are comprised of a pair of hook members secured to each of said side portions for extending over the top of said automobile seat.

5. A safety car seat as set forth in claim 4 wherein said hook means are adjustable and comprise bracket means secured to said seat, said bracket means having various adjustment positions and pin means on one end of said hook means adapted to be received by said bracket means in one of said adjustment positions.

6. A safety car seat as set forth in claim 1 wherein said safety car seat is formed of a single one-piece molded article.

7. A safety car seat as set forth in claim 1 wherein said front cross member and said crotch guard are pivotally secured to one of said side portions by hinge means and releasably secured to the other side portion by latch means.

8. A safety car seat as set forth in claim 7 wherein said crotch guard means is comprised of a strap secured to the front cross member and adapted to be releasably secured to said seat member.

9. A safety car seat as set forth in claim 1 wherein said front cross member and said crotch guard means depending therefrom are completely detachable from said side portions.

10. A safety car seat as set forth in claim 9 wherein said detachable front cross member portion is disposed in vertical sliding engagement with said side portions by tongue and groove means and further comprising latch means adapted to releasably secure the lower end of said crotch guard means to said seat portion.

11. A safety car seat as set forth in claim 9 wherein said front cross member portion is provided with a pair of depending side leg portions to support said front portion on said bottom portion.

12. A safety car seat as set forth in claim 11 wherein said bottom portion is provided with a reversely directed flange portion on the upper surface thereof and said side leg portions of said front portion are provided with projections adapted to extend under said flange means to releasably secure said side leg portions in position.

13. A safety car seat as set forth in claim 11 further comprising latch means adapted to secure each side of said front cross member to said side portions and single latch operator means adapted to simultaneously control each of said latch means.

14. A safety car seat as set forth in claim 1 wherein said means for securing the upper portion of said car seat to the back of an automobile seat is comprised of strap means adapted to extend about the back of said automobile seat, hook means slidably adjustable on said strap means, aperture means located in said back portion adjacent the top edge thereof for receiving said hook means.